United States Patent [19]

Longo et al.

[11] 4,251,496
[45] Feb. 17, 1981

[54] PROCESS FOR THE REMOVAL OF $SO_x$ AND $NO_x$ FROM GASEOUS MIXTURE CONTAINING THE SAME

[75] Inventors: John M. Longo, New Providence, N.J.; Neville L. Cull, Baker, La.

[73] Assignee: Exxon Research & Engineering Co., Florham Park, N.J.

[21] Appl. No.: 22,924

[22] Filed: Mar. 22, 1979

[51] Int. Cl.³ ............................................. B01D 53/00
[52] U.S. Cl. ................................. 423/239 A; 423/244
[58] Field of Search ........................... 423/239 A, 244

[56] References Cited

U.S. PATENT DOCUMENTS

| | | | |
|---|---|---|---|
| 3,885,019 | 5/1975 | Matsushita et al. | 423/239 A |
| 4,001,375 | 1/1977 | Longo | 423/244 |
| 4,115,516 | 9/1978 | Takami et al. | 423/239 A |

FOREIGN PATENT DOCUMENTS 1438120  6/1976  United Kingdom ............... 423/239 A

*Primary Examiner*—G. O. Peters
*Attorney, Agent, or Firm*—Marthe L. Gibbons

[57] ABSTRACT

A combination process is provided in which a gaseous mixture comprising $SO_x$ and $NO_x$ is reacted with cerium oxide at a temperature ranging from about 500° C. to about 700° C. to form cerium oxysulfate and a gas which is at least partially desulfurized. The latter is contacted with cerium oxysulfate at a temperature ranging from about 500° C. to about 700° C. in the presence of ammonia at net oxidizing conditions to reduce the $NO_x$ content of the gaseous mixture. The process may be conducted in one reaction zone or in a plurality of reaction zones. The cerium oxide reactant may be regenerated by reacting cerium oxysulfate with a reducing gas such as hydrogen.

12 Claims, 2 Drawing Figures

PROCESS FOR THE REMOVAL OF SO$_x$ AND NO$_x$ FROM GASEOUS MIXTURE CONTAINING THE SAME

BACKGROUND OF THE INVENTION

1. Field of the Invention

This invention relates to a combination gas cleanup process for the removal of sulfur dioxide and nitrogen oxides from a gaseous mixture.

2. Description of the Prior Art

Processes for the removal of sulfur dioxide or nitrogen oxides from gaseous mixtures are known.

It is known to use cerium oxide for the removal of sulfur oxides from flue gases at a temperature of 500° to 600° C. and to regenerate the cerium oxide by utilizing a reducing gas. See U.S. Pat. No. 4,001,375 which is hereby incorporated by reference.

U.S. Pat. No. 3,885,019 discloses a process for removing oxides of nitrogen in an exhaust gas utilizing a catalyst of cerium oxide in the presence of ammonia at a temperature ranging from 200° to 650° C. In specific examples, temperatures above 500° C. are disclosed.

U.S. Pat. No. 4,115,516 discloses the use of cerium oxide or cerium sulfate as the starting reagent for the removal of nitrogen oxides in the presence of ammonia (see col. 2, lines 30–35 and col. 1, lines 53–68).

It has now been found that sulfur dioxide and a nitrogen oxide can be removed from a gaseous mixture containing both of these undesired components at the same temperature when certain cerium compounds are utilized.

SUMMARY OF THE INVENTION

In accordance with the invention there is provided, a process for removing at least a portion of sulfur dioxide and at least a portion of a nitrogen oxide from a gaseous mixture comprising the same, and molecular oxygen, which comprises: (a) contacting said gaseous mixture with cerium oxide at reaction conditions including a temperature ranging from about 500° C. to about 700° C. to produce cerium oxysulfate and a gaseous mixture having a decreased content of sulfur dioxide, and (b) contacting the resulting gaseous mixture with cerium oxysulfate in the presence of ammonia at a temperature ranging from about 500° C. to about 700° C., at net oxidizing conditions, for a time sufficient to decrease the nitrogen oxide content in the gaseous mixture.

DESCRIPTION OF THE PREFERRED EMBODIMENTS

Figure 1:
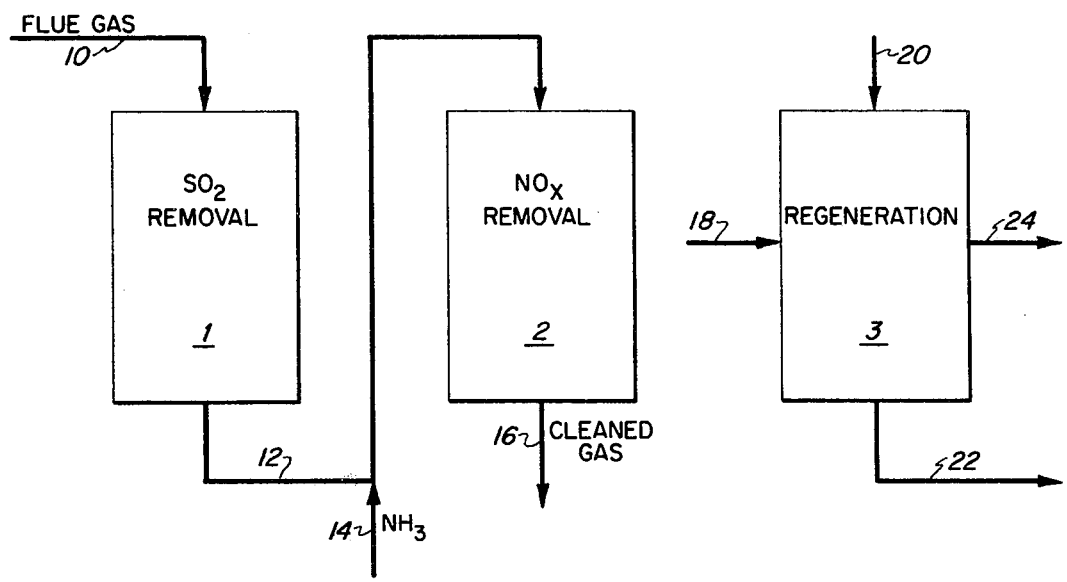
FIG. 1 is a schematic flow plan of one embodiment of the invention.

The preferred embodiments will be described with reference to the drawings. The FIG. 1 embodiment shows a process configuration conducted in three zones. It should be noted that two or three of the zones could be located in the same vessel or in separate vessels. Furthermore, each of the reactions could be staged in more than one zone. Moreover, the reactions could be conducted in the same zone. For simplicity of description, the FIG. 1 process embodiment will be described in three separate zones. Referring to FIG. 1, a gaseous mixture comprising sulfur dioxide and at least one nitrogen oxide is introduced via line 10 into reaction zone 1. Suitable gaseous mixtures comprising both sulfur dioxide and at least one nitrogen oxide for use in the process of the present invention include gaseous mixtures comprising at least about 0.01 mole % sulfur dioxide and at least about 0.001 mole % of a nitrogen oxide. The gaseous mixture may comprise from about 0.01 mole % to about 20 mole % sulfur dioxide and from about 0.001 mole % to about 1 mole % of a nitrogen oxide. The gaseous mixture may additionally comprise molecular oxygen, molecular nitrogen, carbon dioxide, carbon monoxide and water. The process of the present invention is particularly well suited for the removal of sulfur dioxide and nitrogen oxides from exhaust gases (flue gases) resulting from stationary combustion sources wherein the flue gas is a net oxidizing composition. A typical composition of a SO$_x$ and NO$_x$-containing gaseous mixture which may be cleaned according to the process of the present invention is given in Table I. The term "NO$_x$" is used herein to designate oxides of nitrogen.

TABLE I

| Constituents | Gaseous Mixtures Mole % |
|---|---|
| NO$_x$ | 0.01–0.05 |
| SO$_2$ | 0.05–0.50 |
| N$_2$ | 67.45–84.94 |
| O$_2$ | 1.0–5.0 |
| CO$_2$ | 6.0–12.0 |
| H$_2$O | 8.0–15.0 |
| CO | 0–trace |

Reaction zone 1 contains a bed of particles of cerium oxide. The bed may be a moving bed, fixed bed, fluidized bed, ebullating bed, etc. In the embodiments shown in FIG. 1, the particles are maintained in a fixed bed. Cerium oxide may be used as such, that is, unsupported, or the cerium oxide may be composited with a carrier. Suitable carriers include inorganic oxides such as alumina, amorphous silica-alumina, crystalline aluminosilicate zeolites, titania, zirconia, boria, thoria, and mixtures thereof. Preferably the support is alumina. The cerium oxide may be composited with the carrier in any suitable manner known in the art. When the cerium oxide is supported on a carrier, it is generally composited with the carrier in amounts ranging from about 1 to about 40 weight percent of the carrier, preferably from about 2 to about 20 weight percent of the carrier. In reaction zone 1, the gaseous mixture comprising sulfur dioxide, a nitrogen oxide, and molecular oxygen contacts cerium oxide. The sulfur dioxide and molecular oxygen constituents of the gaseous mixture react with cerium oxide to produce cerium oxysulfate and thereby decrease the sulfur dioxide content of the gaseous mixture relative to the initial content of sulfur dioxide in the gaseous mixture. Depending upon the level of sulfur dioxide removal desired, enough cerium compound should be present in reaction zone 1 to yield the desired gas desulfurization level.

Reaction zone 1 is maintained at a temperature ranging from about 500° C. to about 700° C., preferably at a temperature ranging from about 550° C. to about 650° C. The pressure in reaction zone 1 is not critical and may vary widely. Atmospheric pressure is suitable, but higher pressures may be used, if desired. Suitable gas space velocities of the gas introduced by line 10 into reaction zone 1, when cerium oxide is maintained as a fixed bed, range from about 100 to about 30,000 volumes of gas per hour per volume of cerium-containing solids (V/Hr/V) in the reaction zone, preferably from about 1,000 to 10,000 V/Hr/V. Optionally, an oxygen-containing gas such as air may be injected into the gaseous mixture in line 10. The at least partially desulfurized gas, that is, a gaseous mixture comprising a decreased amount of sulfur dioxide relative to the amount of sulfur dioxide in the initial gaseous mixture is passed by line 12 into reaction zone 2 in which is maintained a bed of cerium oxysulfate catalytic particles. Ammonia is introduced into line 12 via line 14. In the embodiment of FIG. 1, the bed in reaction zone 2 is a fixed bed, although the particles could suitably be maintained in reaction zone 2 in a moving bed, fluidized bed, ebullating bed, etc. If desired, at least a portion of the cerium oxysulfate produced in the reaction may be used as the catalyst of reaction zone 2. However, the cerium oxysulfate used could be obtained from extraneous sources (that is, outside the process). Reaction zone 2 is maintained at net oxidizing conditions. The temperature in reaction zone 2 is maintained within the same range as that of reaction zone 1, that is, a range from about 500° C. to about 700° C., preferably from about 550° to about 650° C. and at about the same pressure. In reaction zone 2, the gaseous effluent of reaction zone 1 contacts the catalytic cerium oxysulfate particles in the presence of ammonia at net oxidizing conditions for a time sufficient to decrease the content of nitrogen oxide in the gaseous mixture. Suitable gas space velocities for introduction of the gas carried in line 12 into a fixed bed of catalysts in reaction zone 2 include a gas space velocity of about 1000 to 30,000 V/Hr/V. Suitable ammonia to nitrogen oxide mole ratios in reaction zone 2 include from about 0.67 to 1 to about 2 to 1, preferably about 1 to 1.

Although the FIG. 1 embodiment shows removal of $SO_x$ and removal of $NO_x$ in separate reaction zones, the two stages could be conducted in the same zone. For example, after the gas has been desulfurized to the desired level, and cerium oxysulfate produced, ammonia could be injected into the reaction zone to remove the nitrogen oxides. Returning to reaction zone 2, the cleaned gas from which the nitrogen oxide content has been decreased is removed by line 16.

At least a portion of the cerium oxysulfate may be converted to cerium oxide for reuse in the process. Thus, cerium oxysulfate may be introduced by line 18 into regeneration zone 3. A reducing agent, such as hydrogen, is introduced into reaction zone 3 by line 20 at essentially the same temperatures and pressures utilized in zones 1 and 2. The regeneration zone is maintained at temperatures ranging from about 500° C. to about 700° C. and a pressure ranging from about 0 to about 100 psig for a time sufficient to convert the cerium oxysulfate to cerium oxide. During the regeneration step, $SO_2$ and $H_2S$ are liberated in concentrated form suitable for further processing in a Claus process plant. The cerium oxide is recovered by line 22. It may be reused, if desired, as reactant in reaction zone 1. The other effluent of regeneration zone 3 is removed by line 24. When the $SO_2$ level in the exit gas from reaction zone 1 reaches undesirable levels (note that the $SO_2$ content in exit gas is usually chosen so as to give 90% or more $SO_2$ removal in the $SO_2$ removal step, although the $SO_2$ removal level is arbitrary), the flue gas may be deviated to reaction zone 3 which contains the regenerated cerium oxide, and then either reaction zone 1 or reaction zone 2 may be operated in a regeneration mode. The effluent gas from reaction zone 3 may be introduced either to reaction zone 1 or to reaction zone 2 containing the cerium oxysulfate together with $NH_3$ to effect nitrogen oxide removal.

An alternate manner of conducting the process comprises the use of two swing reactors, one being operated as a $SO_2$ removal zone and the other being operated as a regeneration zone with at least partially desulfurized gas being fed with ammonia into a third reactor containing the cerium oxysulfate for catalytic removal of $NO_x$.

Although the process has been described relative to the use of fixed beds, the process could be conducted in moving beds, fluid beds, ebullating beds, etc., or a combination of bed types.

The following examples are presented to illustrate the invention.

EXAMPLE 1

Figure 2:
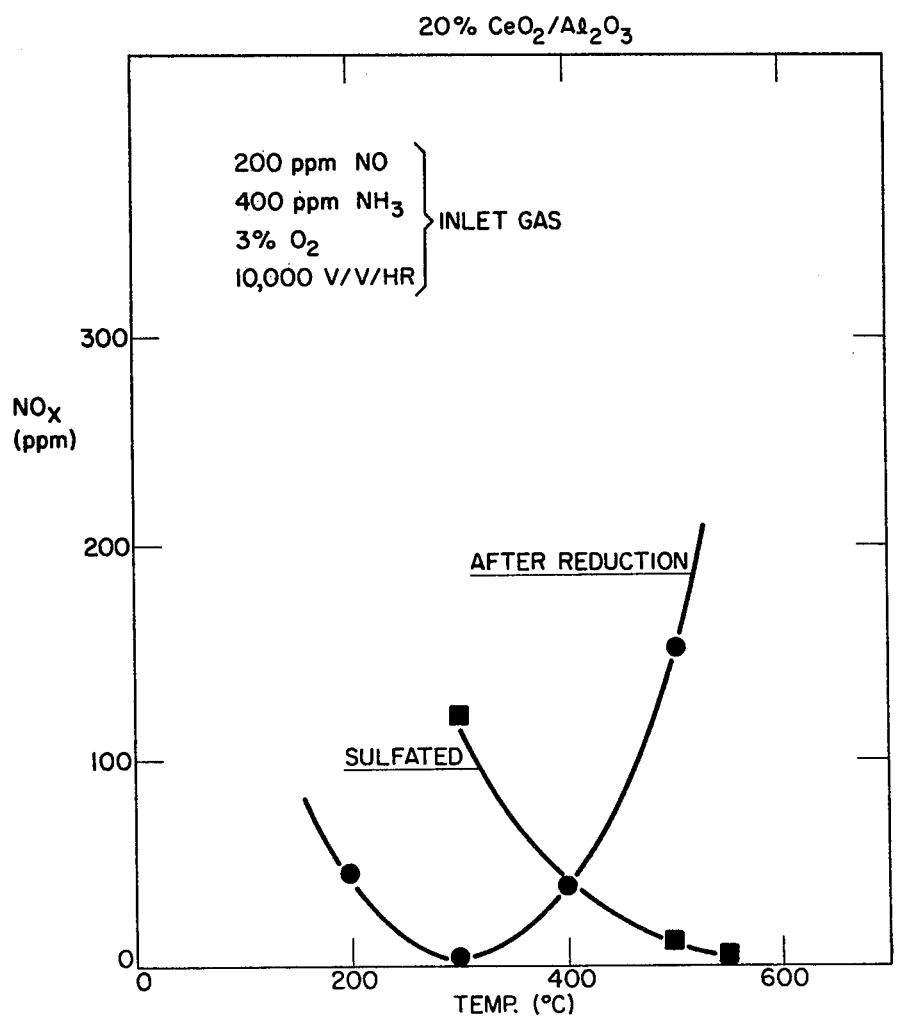
FIG. 2 is a graph showing nitrogen oxide removal versus temperature with a sulfated cerium compound.

A gas comprising 200 ppm NO, 400 ppm $NH_3$, 3 volume percent $O_2$ and the balance being helium was used to simulate the gas fed to the second stage of the present invention. This gaseous mixture was passed over cerium oxysulfate catalyst at various temperatures at a gas space velocity of 10,000 V/V/Hr. The results of these experiments are summarized in graphical form in FIG. 2.

EXAMPLE 2

A simulated flue gas having the following approximate composition: 10 volume percent $CO_2$; 4 volume percent $O_2$; 0.27 volume percent $SO_2$; 225 vppm NO; 10 volume percent $H_2O$ and the balance being nitrogen was passed over 30 cc (23.95 g) of 20-40 mesh (Tyler) cerium oxide on alumina in a reactor. The cerium content by analyses was 11.8 weight percent of the total solids. Ammonia (450 vppm) was introduced into the reactor by using an aqueous ammonia solution (0.25 N) in conjunction with a pump. The reactor was a packed bed type metal reactor of approximately ⅜ inches internal diameter, heated by immersion in a fluidized sand-bath. The simulated flue gas was passed downflow over the cerium oxide on alumina reactant at a temperature of about 600° C. (±5° C.) at a rate of 4580 volumes of gas per volume of cerium oxide on alumina solids per hour. The pollution monitors, comprising Dynasciences equipped with a NX 130 sensor to measure the total oxides of nitrogen and with a 55-330 sensor to measure $SO_2$, were used to monitor the $NO_x$ and $SO_2$ levels in the feed blends and in the exit gases. The analyzers were standardized daily against certified gas blends. The results of this experiment are summarized in Table II. As can be seen from the data in Table II, the initial removal of the $SO_2$ was good. $NO_x$ removal in the early stages of the run showed a tendency to cycle. As the run progressed and the cerium oxide became sulfated, the cycles decreased in amplitude and disappeared completely after 100 minutes. From that time until the end of the run, the fully sulfated cerium oxide, that is, the cerium oxysulfate, was removing from about 97 to 98 percent of the $NO_x$. These results are in agreement with those projected at 600° C. in FIG. 2 over the sulfated cerium compound (i.e. cerium oxysulfate).

TABLE II

$NO_x$-$SO_x$ REMOVAL

Reactant: Ceria on $Al_2O_3$. (14.5% $CeO_2$) 20/40 Mesh
Process Conditions: 600° C.; V/Hr/V$^{(1)}$ 4580; $NH_3/NO_x$;
Mole Ratio 2/1.

| Time (min) | $SO_2$ (ppm) Inlet | $SO_2$ (ppm) Outlet | % $SO_2$ Removed | % Metal Sulfated | $NO_x$ (ppm) Inlet | $NO_x$ (ppm) Outlet | % $NO_x$ Removed |
|---|---|---|---|---|---|---|---|
| 6.4 | 3000 | 15 | 99 | — | 225 | 55 | 76 |
| 18.9 | 3000 | 15 | 99 | — | 225 | 40 | 82 |
| 26.1 | 3000 | 15 | 99 | — | 225 | 40 | 82 |
| 35.1 | 3000 | 15 | 99 | — | 225 | 35 | 84 |
| 52.8 | 3000 | 15 | 99 | — | 225 | 40 | 82 |
| 62.8 | 3000 | 15 | 99 | — | 225 | 45 | 80 |
| 67.3 | 3000 | 75 | 98.8 | 76.7 | 225 | 45 | 80 |
| 70.1 | 3000 | 150 | 98.7 | 79.8 | 225 | 55 | 76 |
| 75.4 | 3000 | 300 | 98.3 | 85.5 | 225 | 35 | 84 |
| 81.0 | 3000 | 600 | 97.4 | 91.0 | 225 | 30 | 87 |
| 84.3 | 3000 | 900 | 96.5 | 93.9 | 225 | 15 | 93 |
| 87.8 | 3000 | 1200 | 95.2 | 96.5 | 225 | 10 | 96 |
| 89.0 | 3000 | 1350 | 94.7 | 97.3 | 225 | 10 | 96 |
| 155.0 | 3000 | 2300 | — | — | 225 | 5 | 98 |

$^{(1)}$Corrected to 60° F. and 1 atm pressure.
Note-90% $SO_2$ removal calculated time ca 100 minutes; % cerium utilized ca 104%.
From ca 100 min. on $NO_x$ removal steady at ca 98%.

What is claimed is:

1. A process for removing at least a portion of sulfur dioxide and at least a portion of a nitrogen oxide from a gaseous mixture comprising the same and molecular oxygen, which comprises:
   (a) contacting said gaseous mixture with cerium oxide at reaction conditions including a temperature ranging from about 500° C. to about 700° C. to produce cerium oxysulfate and a gaseous mixture having a decreased content of sulfur dioxide, and
   (b) contacting the resulting gaseous mixture with at least a portion of said cerium oxysulfate resulting from step (a) in the presence of ammonia at a temperature ranging from about 500° C. to about 700° C., said step (a) and said step (b) being conducted at about the same temperature, at net oxidizing conditions, for a time sufficient to decrease the nitrogen oxide content of said gaseous mixture.

2. The process of claim 1 wherein the gaseous initial mixture of step (a) comprises at least 0.01 mole percent sulfur dioxide and at least 0.001 mole percent of a nitrogen oxide.

3. The process of claim 1 wherein said cerium oxide is regenerated by reacting at least a portion of said cerium oxysulfate with a reducing agent at reaction conditions to convert cerium oxysulfate to cerium oxide.

4. The process of claim 1 wherein said cerium oxide of step (a) is composited with a carrier.

5. The process of claim 7 wherein said carrier is selected from the group consisting of alumina, amorphous silica-alumina, crystalline aluminosilicate zeolites, titania, zirconia, thoria, boria, and mixtures thereof.

6. The process of claim 5 wherein said carrier is alumina.

7. The process of claim 1 wherein said cerium oxide is disposed in a fixed bed and wherein the space velocity of the gaseous initial mixture of step (a) ranges from about 100 to about 30,000 V/Hr/V.

8. The process of claim 1 wherein said cerium oxysulfate is disposed in a fixed bed and wherein the space velocity of said gaseous mixture of step (b) ranges from about 1000 to about 30,000 V/Hr/V.

9. The process of claim 1 wherein step (a) and step (b) are conducted in one reaction zone.

10. The process of claim 1 wherein said process is conducted in at least two reaction zones.

11. The process of claim 1 wherein the ammonia to nitrogen oxide mole ratio in step (b) ranges from about 0.67 to 1 to about 2 to 1.

12. The process of claim 1 wherein said temperature of step (a) ranges from about 550° C. to about 650° C. and wherein said temperature in step (b) ranges from about 550° C. to about 650° C.

* * * * *